(12) United States Patent
Trombetta et al.

(10) Patent No.: US 10,953,322 B2
(45) Date of Patent: Mar. 23, 2021

(54) SCALED VR ENGAGEMENT AND VIEWS IN AN E-SPORTS EVENT

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/908,704

(22) Filed: Feb. 28, 2018

(65) Prior Publication Data

US 2019/0262705 A1    Aug. 29, 2019

(51) Int. Cl.
*A63F 13/26* (2014.01)
*G06Q 30/02* (2012.01)
(Continued)

(52) U.S. Cl.
CPC ............ *A63F 13/26* (2014.09); *A63F 13/525* (2014.09); *A63F 13/61* (2014.09); *A63F 13/86* (2014.09);
(Continued)

(58) Field of Classification Search
CPC ........ A63F 13/26; A63F 13/525; A63F 13/61; A63F 13/86
(Continued)

(56) References Cited

U.S. PATENT DOCUMENTS 5,729,471 A    3/1998   Jain et al.
5,995,518 A   11/1999   Burns et al.
(Continued)

FOREIGN PATENT DOCUMENTS

CN    110201395 A    9/2019
CN    110201399 A    9/2019
(Continued)

OTHER PUBLICATIONS

U.S. Appl. No. 15/448,356 Office Action dated Jan. 8, 2019.
(Continued)

*Primary Examiner* — Omkar A Deodhar
*Assistant Examiner* — Shauna-Kay Hall
(74) *Attorney, Agent, or Firm* — Polsinelli LLP

(57) ABSTRACT

The present disclosure describes methods and systems directed towards providing scaled engagement and views of an e-sports event. Instead of providing the same distribution of live e-sport event data to all remote viewers of a live e-sports event, features associated with e-sports gaming network could be used to customize the distribution of live e-sport event data to promote immersive viewer experience. The enhanced immersion can also be carried out in a virtual reality or augmented reality setting. The features would be capable of providing additional information, different views, and a variety of different commentators for the e-sports event so that the viewer can be more engaged when viewing the particular e-sports event. With the increased engagement from remote viewers, the distribution of live e-sports event data can also be further modified for monetization by incorporating advertisements as well.

19 Claims, 4 Drawing Sheets

(51) Int. Cl.
*A63F 13/61* (2014.01)
*A63F 13/525* (2014.01)
*A63F 13/86* (2014.01)

(52) U.S. Cl.
CPC .. *G06Q 30/0241* (2013.01); *A63F 2300/8082* (2013.01)

(58) Field of Classification Search
USPC .......................................................... 463/31
See application file for complete search history.

(56) References Cited

U.S. PATENT DOCUMENTS

| | | | |
|---|---|---|---|
| 6,415,317 B1 | 7/2002 | Yelon et al. | |
| 6,631,522 B1 | 10/2003 | Erdelyi | |
| 6,877,134 B1 | 4/2005 | Fuller et al. | |
| 7,499,475 B2 | 3/2009 | Kashiwagi et al. | |
| 8,025,572 B2 | 9/2011 | Spanton et al. | |
| 8,187,104 B2 | 5/2012 | Pearce | |
| 8,202,167 B2 | 6/2012 | Ackely et al. | |
| 8,645,844 B1 | 2/2014 | Strobel et al. | |
| 9,233,305 B2 | 1/2016 | Laakkonen et al. | |
| 9,433,855 B1 | 9/2016 | Keeker et al. | |
| 9,473,825 B2 | 10/2016 | Gossweiler et al. | |
| 9,497,424 B2 | 11/2016 | Kosseifi et al. | |
| 9,782,678 B2 | 10/2017 | Long et al. | |
| 9,860,477 B2 | 1/2018 | Kummer et al. | |
| 9,871,997 B2 | 1/2018 | Kosseifi et al. | |
| 9,968,856 B1 | 5/2018 | Ninoles et al. | |
| 10,277,813 B1* | 4/2019 | Thomas | H04N 5/23206 |
| 10,471,360 B2 | 11/2019 | Trombetta | |
| 10,751,623 B2 | 8/2020 | Trombetta | |
| 10,765,938 B2 | 9/2020 | Trombetta | |
| 10,765,957 B2 | 9/2020 | Trombetta | |
| 10,792,576 B2 | 10/2020 | Trombetta | |
| 10,792,577 B2 | 10/2020 | Trombetta | |
| 10,814,228 B2 | 10/2020 | Trombetta | |
| 10,818,142 B2 | 10/2020 | Trombetta | |
| 2002/0034980 A1 | 3/2002 | Lemmons et al. | |
| 2002/0107040 A1 | 8/2002 | Crandall et al. | |
| 2003/0177347 A1 | 9/2003 | Schneier et al. | |
| 2003/0220143 A1 | 11/2003 | Shteyn et al. | |
| 2004/0147306 A1 | 7/2004 | Randall et al. | |
| 2004/0189701 A1 | 9/2004 | Badt | |
| 2004/0266535 A1 | 12/2004 | Reeves | |
| 2006/0105827 A1 | 5/2006 | Metzger et al. | |
| 2006/0247060 A1 | 11/2006 | Hanson et al. | |
| 2007/0018952 A1* | 1/2007 | Arseneau | G06F 1/1626 |
| | | | 345/156 |
| 2007/0021058 A1 | 1/2007 | Aresneau et al. | |
| 2007/0070914 A1 | 3/2007 | Abigail | |
| 2007/0117635 A1 | 5/2007 | Spanton et al. | |
| 2007/0248261 A1 | 10/2007 | Zhou et al. | |
| 2008/0079752 A1* | 4/2008 | Gates | G06F 3/011 |
| | | | 345/633 |
| 2008/0113815 A1 | 5/2008 | Weingardt et al. | |
| 2008/0200254 A1 | 8/2008 | Cayce et al. | |
| 2009/0036214 A1 | 2/2009 | Dahl | |
| 2009/0208181 A1 | 8/2009 | Cottrell | |
| 2009/0225828 A1 | 9/2009 | Perlman et al. | |
| 2009/0271821 A1 | 10/2009 | Zalewski | |
| 2010/0099330 A1 | 4/2010 | Digiovanni | |
| 2010/0100512 A1 | 4/2010 | Brodin et al. | |
| 2010/0240443 A1 | 9/2010 | Baerlocher et al. | |
| 2011/0207523 A1 | 8/2011 | Filipour et al. | |
| 2011/0263332 A1 | 10/2011 | Mizrachi | |
| 2011/0263333 A1 | 10/2011 | Dokei et al. | |
| 2011/0275431 A1 | 11/2011 | Hirzel et al. | |
| 2012/0093481 A1 | 4/2012 | McDowell et al. | |
| 2012/0283017 A1 | 11/2012 | Ahiska et al. | |
| 2013/0002949 A1 | 1/2013 | Raveendran et al. | |
| 2013/0007013 A1 | 1/2013 | Geisner et al. | |
| 2013/0083173 A1* | 4/2013 | Geisner | G06F 3/1423 |
| | | | 348/51 |
| 2013/0123019 A1 | 5/2013 | Sullivan et al. | |
| 2013/0254680 A1 | 9/2013 | Buhr et al. | |
| 2013/0296051 A1 | 11/2013 | Gault et al. | |
| 2013/0324239 A1 | 12/2013 | Ur et al. | |
| 2014/0004951 A1 | 1/2014 | Kern et al. | |
| 2014/0087846 A1 | 3/2014 | Bryan et al. | |
| 2014/0087851 A1 | 3/2014 | Low et al. | |
| 2014/0113718 A1 | 4/2014 | Norman et al. | |
| 2014/0142921 A1 | 5/2014 | Gleadall et al. | |
| 2014/0171039 A1 | 6/2014 | Bjontegard | |
| 2014/0171182 A1 | 6/2014 | Versaci | |
| 2014/0179440 A1 | 6/2014 | Perry | |
| 2014/0274307 A1 | 9/2014 | Gonzalez | |
| 2014/0274370 A1 | 9/2014 | Shah | |
| 2014/0297408 A1 | 10/2014 | Zabala | |
| 2015/0005052 A1 | 1/2015 | Harrington et al. | |
| 2015/0011283 A1 | 1/2015 | Sanford et al. | |
| 2015/0018990 A1 | 1/2015 | Shachar et al. | |
| 2015/0024850 A1 | 1/2015 | Kokami et al. | |
| 2015/0113548 A1 | 4/2015 | Stern et al. | |
| 2015/0141140 A1 | 5/2015 | Lampe et al. | |
| 2015/0248792 A1* | 9/2015 | Abovitz | G02B 6/10 |
| | | | 345/633 |
| 2015/0281029 A1 | 10/2015 | Callahan et al. | |
| 2015/0348373 A1 | 12/2015 | Weingardt et al. | |
| 2015/0375117 A1* | 12/2015 | Thompson | H04N 21/254 |
| | | | 463/9 |
| 2016/0051895 A1 | 2/2016 | Hood | |
| 2016/0253865 A1* | 9/2016 | Men | G07F 17/3272 |
| | | | 463/25 |
| 2016/0286244 A1 | 9/2016 | Chang et al. | |
| 2016/0310843 A1 | 10/2016 | Webb | |
| 2016/0365121 A1 | 12/2016 | DeCaprio | |
| 2016/0373499 A1 | 12/2016 | Wagner et al. | |
| 2017/0001111 A1 | 1/2017 | Willette et al. | |
| 2017/0001112 A1* | 1/2017 | Gilmore | A63F 13/30 |
| 2017/0003740 A1* | 1/2017 | Verfaillie | G06F 3/013 |
| 2017/0006074 A1 | 1/2017 | Oates | |
| 2017/0072324 A1 | 3/2017 | Navok et al. | |
| 2017/0113143 A1 | 4/2017 | Marr | |
| 2017/0157512 A1 | 6/2017 | Long et al. | |
| 2017/0266549 A1 | 9/2017 | Paradise | |
| 2017/0266552 A1 | 9/2017 | Paradise et al. | |
| 2017/0270751 A1 | 9/2017 | Paradise | |
| 2017/0304724 A1 | 10/2017 | Cotter | |
| 2017/0332131 A1 | 11/2017 | Opsenica et al. | |
| 2017/0354875 A1* | 12/2017 | Marks | A63F 13/52 |
| 2018/0077438 A1* | 3/2018 | Hansen | H04N 21/458 |
| 2018/0139257 A1 | 5/2018 | Ninoles et al. | |
| 2018/0167656 A1* | 6/2018 | Ortiz | A63F 13/355 |
| 2018/0192144 A1 | 7/2018 | McElroy | |
| 2018/0250598 A1 | 9/2018 | Trombetta | |
| 2018/0250600 A1 | 9/2018 | Trombetta | |
| 2018/0367820 A1 | 12/2018 | Abulikemu | |
| 2019/0262706 A1 | 8/2019 | Trombetta | |
| 2019/0262712 A1 | 8/2019 | Trombetta | |
| 2019/0262713 A1 | 8/2019 | Trombetta | |
| 2019/0262717 A1 | 8/2019 | Thielbar | |
| 2019/0262720 A1 | 8/2019 | Trombetta | |
| 2019/0262723 A1 | 8/2019 | Trombetta | |
| 2019/0262724 A1 | 8/2019 | Trombetta | |
| 2019/0262727 A1 | 8/2019 | Trombetta | |
| 2019/0266845 A1 | 8/2019 | Trombetta | |
| 2020/0179812 A1 | 6/2020 | Trombetta | |
| 2020/0384364 A1 | 12/2020 | Trombetta | |
| 2020/0398157 A1 | 12/2020 | Trombetta | |
| 2020/0398169 A1 | 12/2020 | Trombetta | |
| 2020/0406152 A1 | 12/2020 | Trombetta | |
| 2021/0016190 A1 | 1/2021 | Trombetta | |

FOREIGN PATENT DOCUMENTS

| | | |
|---|---|---|
| CN | 110201404 A | 9/2019 |
| CN | 110573221 A | 12/2019 |
| CN | 111971097 A | 11/2020 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |

(56) References Cited

FOREIGN PATENT DOCUMENTS

| KR | 10-2020-0128523 | 11/2020 |
|---|---|---|
| KR | 10-2020-0135946 | 12/2020 |
| KR | 10-2020-0136894 | 12/2020 |
| WO | WO 2014/109435 | 7/2014 |
| WO | WO 2016/048204 | 3/2016 |
| WO | WO 2017/004433 | 1/2017 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

U.S. Appl. No. 15/450,602 Final Office Action dated Nov. 2, 2018.
U.S. Appl. No. 15/448,356 Final Office Action dated Aug. 31, 2018.
PCT Application No. PCT/US2019/015120 International Search Report and Written Opinion dated Apr. 15, 2019.
PCT Application No. PCT/US2019/015124 International Search Report and Written Opinion dated Apr. 15, 2019.
PCT Application No. PCT/US2019/016686 International Search Report and Written Opinion dated Apr. 10, 2019.
PCT Application No. PCT/US2019/016698 International Search Report and Written Opinion dated Apr. 11, 2019.
PCT Application No. PCT/US2019/016694 International Search Report and Written Opinion dated Apr. 15, 2019.
PCT Application No. PCT/US2019/017100 International Search Report and Written Opinion dated Apr. 17, 2019.
PCT Application No. PCT/US2018/013378 International Search Report and Written Opinion dated Mar. 8, 2018.
U.S. Appl. No. 15/450,602 Office Action dated Apr. 6, 2018.
PCT Application No. PCT/US2018/021197 International Search Report and Written Opinion dated May 30, 2018.
U.S. Appl. No. 15/448,356 Office Action dated Mar. 5, 2018.
U.S. Appl. No. 15/448,356 Final Office Action dated Aug. 6, 2019.
U.S. Appl. No. 15/908,712 Office Action dated Aug. 8, 2019.
U.S. Appl. No. 16/681,477, Steven Trombetta, User-Driven Spectator Channel for Live Game Play in Multi-Player Games, filed Nov. 12, 2019.
PCT Application No. PCT/US2018/013378 International Preliminary Report on Patentability dated Sep. 3, 2019.
PCT Application No. PCT/US2019/016167 International Search Report and Written Opinion dated Aug. 26, 2019.
U.S. Appl. No. 15/908,438 Office Action dated Oct. 3, 2019.
U.S. Appl. No. 15/908,707 Final Office Action dated Nov. 18, 2019.
PCT Application No. PCT/US2019/015123 International Search Report and Written Opinion dated Apr. 23, 2019.
PCT Application No. PCT/US2019/015125 International Search Report and Written Opinion dated Apr. 23, 2019.
PCT Application No. PCT/US2019/016180 International Search Report and Written Opinion dated Apr. 23, 2019.
U.S. Appl. No. 15/450,602 Office Action dated Jun. 28, 2019.
U.S. Appl. No. 15/908,569 Office Action dated Jun. 28, 2019.
U.S. Appl. No. 15/908,722 Office Action dated Jun. 28, 2019.
U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,707 Office Action dated Jul. 17, 2019.
U.S. Appl. No. 16/681,477 Office Action dated Apr. 16, 2020.
U.S. Appl. No. 15/908,569 Office Action dated Mar. 27, 2020.
PCT Application No. PCT/US2019/015275 International Search Report and Written Opinion dated Apr. 23, 2019.
U.S. Appl. No. 15/908,345 Office Action dated Jan. 10, 2020.
U.S. Appl. No. 15/448,356 Office Action dated May 28, 2020.
U.S. Appl. No. 15/908,722 Final Office Action dated Jun. 12, 2020.
U.S. Appl. No. 15/448,356, Steven Trombetta, System and Method for Managing Online Gaming League, filed Mar. 2, 2017.
PCT/US18/13378, System and Method for Managing Online Gaming League, Jan. 11, 2018.
U.S. Appl. No. 15/908,569, Chris Thielbar, Online Tournament Integration.
U.S. Appl. No. 15/908,722, Steven Trombetta, Statistical Driven Tournaments.
U.S. Appl. No. 15/908,635, Steven Trombetta, Statistically Defined Game Channels.
U.S. Appl. No. 15/908,531, Steven Trombetta, Integrating Commentary Content and Gameplay Content Over a Multi-User Platform.
U.S. Appl. No. 15/908,657, Steven Trombetta, De-Interleaving Gameplay Data.
U.S. Appl. No. 15/908,438, Steven Trombetta, Incentivizing Players to Engage in Competitive Gameplay.
U.S. Appl. No. 15/908,345, Steven Trombetta, Player to Spectator Handoff and Other Spectator Controls.
U.S. Appl. No. 15/908,712, Steven Trombetta, Discovery and Detection of Events in Interactive Content.
U.S. Appl. No. 15/908,707, Steven Trombetta, Creation of Winnder Tournaments With Fandom Influence.
PCT/US19/17100, Online Tournament Integration, Feb. 7, 2019.
PCT/US19/15120, Statistical Driven Tournaments, Jan. 25, 2019.
PCT/US19/15124, Statistically Defined Game Channels, Jan. 25, 2019.
PCT/US19/15273, Integrating Commentary Content and Gameplay Content Over a Multi-User Platform, Jan. 25, 2019.
PCT/US19/15275, De-Interleaving Gameplay Data, Jan. 25, 2019.
PCT/US18/16180, Incentivizing Players to Engage in Competitive Gameplay, Jan. 31, 2019.
PCT/US19/16167, Player to Spectator Handoff and Other Spectator Controls, Jan. 31, 2019.
PCT/US19/16694, Scaled VR Engagement and Views in an E-Sports Event, Feb. 5, 2019.
PCT/US19/16686, Discovery and Detection of Events in Interactive Content, Feb. 5, 2019.
PCT/US19/16698, Creation of Winner Tournaments With Fandom Influence, Feb. 5, 2019.
U.S. Appl. No. 15/450,602, Steven Trombeta, User-Driven Spectator Channel for Live Game Play in Multi-Player Games, filed Mar. 6, 2017.
PCT/US18/21197, User-Driven Spectator Channel for Live Game Play in Multi-Player Games, Mar. 6, 2017.
U.S. Appl. No. 17/080,551, Steven Trombetta, Statistically Defined Game Channels, filed Oct. 26, 2020.
U.S. Appl. No. 17/014,149, Steven Trombetta, Integrating Commentary Content and Gameplay Content Over a Multi-User Platform, filed Sep. 8, 2020.
U.S. Appl. No. 17/014,182, Steven Trombetta, De-Interleaving Gameplay Data, filed Sep. 8, 2020.
U.S. Appl. No. 17/000,841, Steven Trombetta, Incentivizing Players to Engage in Competitive Gameplay, filed Aug. 24, 2020.
U.S. Appl. No. 14/015,845, Steven Trombetta, Player to Spectator Handoff and Other Spectator Controls, filed Sep. 9, 2020.
U.S. Appl. No. 17/060,458, Steven Trombetta, Discovery and Detection of Events in Interactive Content, filed Oct. 1, 2020.
U.S. Appl. No. 17/080,580, Steven Trombetta, Creatioin of Winner Tournaments With Fandom Influence, filed Oct. 26, 2020.
NAHL ranked #1 by The Junior Hockey News_North American Hockey League_NAHL.pdf, http://nahl.com/news/story.cfm?id=15090, Jul. 16, 2015 (Year: 2015).
PCT Application No. PCT/US2018/021197 International Preliminary Report on Patentability dated Sep. 10, 2020.
PCT Application No. PCT/US2019/015120 International Preliminary Report on Patentability dated Sep. 1, 2020.
PCT Application No. PCT/US2019/015273 International Preliminary Report on Patentability dated Sep. 1, 2020.
PCT Application No. PCT/US2019/015124 International Preliminary Report on Patentability dated Sep. 1, 2020.

(56) References Cited

OTHER PUBLICATIONS

PCT Application No. PCT/US2019/015275 International Preliminary Report on Patentability dated Sep. 1, 2020.
PCT Application No. PCT/US2019/016167 International Preliminary Report on Patentability dated Sep. 1, 2020.
PCT Application No. PCT/US2019/016180 International Preliminary Report on Patentability dated Sep. 1, 2020.
PCT Application No. PCT/US2019/016686 International Preliminary Report on Patentability dated Sep. 1, 2020.
PCT Application No. PCT/US2019/016698 International Preliminary Report on Patentability dated Sep. 1, 2020.
PCT Application No. PCT/US2019/016694 International Preliminary Report on Patentability dated Sep. 1, 2020.
PCT Application No. PCT/US2019/017100 International Preliminary Report on Patentability dated Sep. 1, 2020.
U.S. Appl. No. 15/448,356 Final Office Action dated Oct. 21, 2020.
U.S. Appl. No. 15/908,722 Office Action dated Oct. 30, 2020.
U.S. Appl. No. 16/681,477 Final Office Action dated Nov. 30, 2020.
EP Application No. 18763374.8, Extended European Search Report dated Dec. 14, 2020.

* cited by examiner

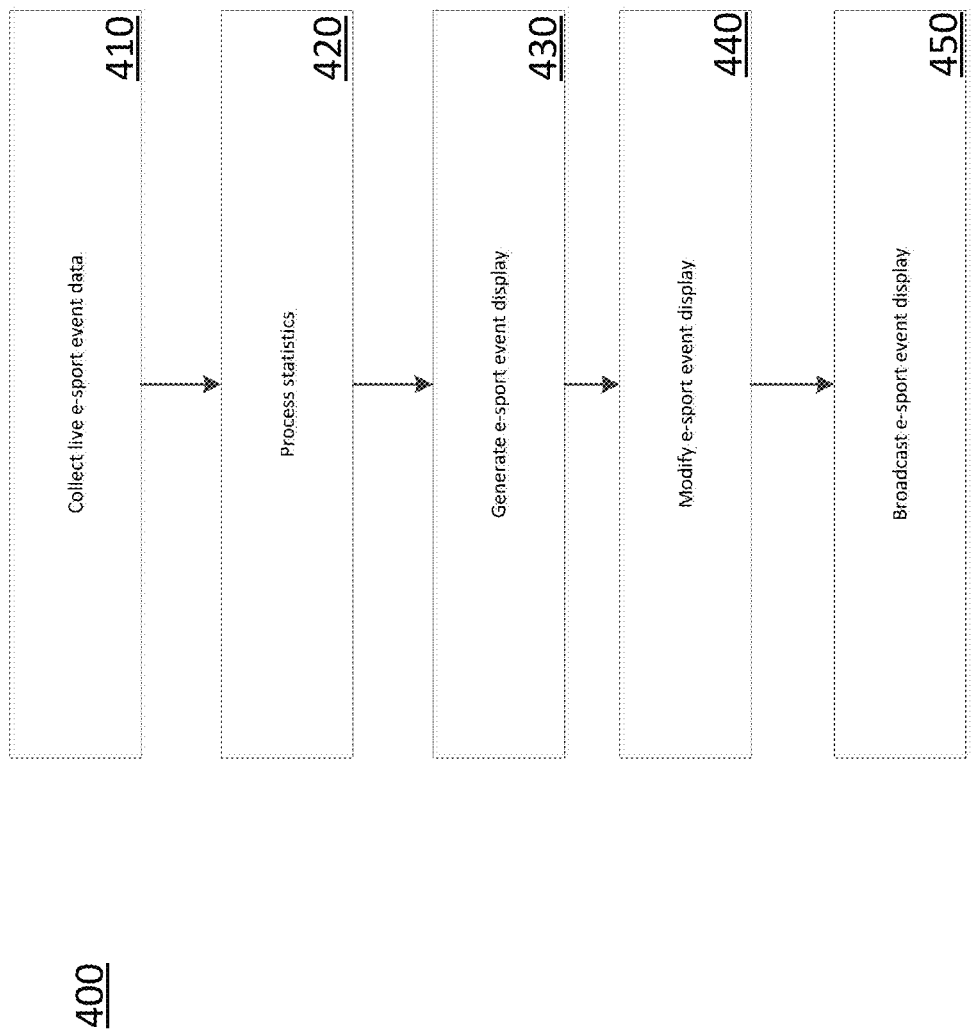

SCALED VR ENGAGEMENT AND VIEWS IN AN E-SPORTS EVENT

BACKGROUND

Field of Invention

The present invention generally relates to electronic sports (e-sports). More specifically, the present invention relates to scaled virtual reality (VR) engagement and views in an e-sports event.

Description of the Related Art

Competitive gaming, commonly referred to as electronic sports or "eSports," involve the play of video games in a competitive environment. Videogame competitions have existed for nearly as long as video games themselves. Early competitions were set up as tournament style matches between players focused on one particular game, often tied to a new product release. Eventually, competitive leagues and a constant stream of tournaments evolved to provide structure for the eSports community. Players now have the option of competing in a vast array of professional and amateur competitions held at physical locations or in virtual competitions conducted online. Leagues and content providers such as Major League Gaming (MLG), and Global StarCraft® League, provide opportunities for competition and to find information about competitive gaming. Until recently, participation in competitive gaming has demonstrated a gradual and steady pace in growth. However, competitive gaming is presently undergoing a rapid expansion in participation and interest.

The video game competitions generally involve professional players in a variety of different organized multiplayer video game competitions. Common e-sport video games genres include real-time strategy (e.g. StarCraft 2, WarCraft 3), fighting (e.g. Smash Bros, Street Fighter), first-person shooter (e.g. Counter-Strike, Overwatch), and multiplayer online battle arena (e.g. League of Legends, Heroes of the Storm).

There are a number of existing tournaments for e-sports that provide prize money to competitors as well distributions of the video game competition (for example via live broadcasts or streams) for viewers around the world. In 2013, it was estimated that 71.5 million people worldwide watched some form of e-sport competition. Individual events may have over 1 million unique viewers.

Currently there is a limited number of existing online streaming media platforms that allow for the promotion of e-sports competitions and monetization of the streams associated with the e-sports competitions. Although there have been moves towards gaming companies to provide more focus towards e-sports with its growing popularity, the present way the e-sports competitions are distributed to the viewers to view (for example via broadcasts) do not have many customizable features that could provide more engagement for the viewers. Generally, the distributed information provided to the various viewers on the e-sports competition streams pale in comparison to the experience and information that is available to viewers who attend the live e-sports competition. There is a need to provide more customization to the distribution of e-sport competition information (for example via broadcasts or streams) in order to provide better engagement and monetization capabilities for users who view the e-sport competitions remotely.

Furthermore, with the improvements and availability of virtual reality (and augmented reality), there is a need to also implement these mediums as a means to provide more immersive user viewing experience of e-sport events.

SUMMARY OF THE CLAIMED INVENTION

Embodiments of the present invention include a method for providing scaled engagement and views of a live electronic sport (e-sport) event. The method first collects information from a live e-sport event. The collected information is then processed in order to generate detailed statistics about the players within the live e-sport event. Using the collected information, an e-sport event display is generated regarding the live e-sport event. The e-sport event display is then modified using the generated detailed statistics. The modified e-sport event display is then distributed for viewing (for example via a live broadcast or stream) by remote viewers, wherein the modified e-sport event display is specific to that remote viewer.

Embodiments of the present invention also include a system for providing scaled engagement and views of a live electronic sport (e-sport) event. The system includes an event server that collects information from a live e-sport event. A gaming server is also included that is used to process the collected e-sport event information. Using the collected information, the gaming server also generates an e-sport event display and modifies the display using the processed information. The modified e-sport event display is distributed to remote viewers on their respective user devices. The system also includes a plurality of databases used for storing information useful for generating and modifying the e-sport event displays.

Embodiments of the present invention include a non-transitory computer-readable storage medium having embodied thereon a program, the program being executable by a processor to perform a method for providing scaled engagement and views of a live electronic sport (e-sport) event. The method first collects information from a live e-sport event. The collected information is then processed in order to generate detailed statistics about the players within the live e-sport event. Using the collected information, an e-sport event display is generated regarding the live e-sport event. The e-sport event display is then modified using the generated detailed statistics. The modified e-sport event display is then distributed for viewing by remote viewers, wherein the modified e-sport event display is specific to that remote viewer.

BRIEF DESCRIPTION OF THE DRAWINGS

FIG. 4 is a method for providing the scaled engagement and views to a remote viewer.

DETAILED DESCRIPTION

The present disclosure describes methods and systems directed towards providing scaled engagement and views of an e-sports event. Instead of providing the same distribution of information of a live e-sports event to all remote viewers (e.g. live broadcast or stream), features associated with e-sports gaming network could be used to customize video distribution of the e-sports events to promote immersive viewer experience. In addition, customization can also be provided to typical video distribution. The features would be capable of providing additional information, different views, and a variety of different commentators for the e-sports event so that the viewer can be more engaged when viewing the particular e-sports event. With the increased engagement from remote viewers, the e-sports distributions can also be further modified for monetization with the implementation of advertisements.

The enhanced immersion can also be carried out by implementing more customization in viewing the e-sports events in a virtual reality or augmented reality setting. The virtual reality or augmented reality embodiments may include features that allow for the simulation of the e-sport event and provide the viewer a more immersive view. For example, viewers may be provided a viewing experience (for example, with viewpoint of the e-sport event from a particular seat, crowd noise and interactions) as if the viewer was actually viewing the event from the location the e-sport event was being held at. Virtual reality or augmented reality can also be used to render a perspective for the viewer as if the viewer was within the video game as well.

As referred to herein, an e-sports event is a competition involving a number of different video game competitors. The video game used for the competition can vary from a wide variety of genres and titles. People can attend and view live e-sport events much like other typical sports (e.g. football, basketball) in designated arenas or stadiums. People can also view these live e-sports events remotely via distributions to their respective computing devices 120 via an e-sport event stream. Much like how sporting events (e.g. football) are distributed to remote viewers and are able to provide an immersive experience to users with the implementation of additional commentary, statistics, and illustrations, the present application aims to incorporate and automate these same features within the realm of distribution of live e-sports event.

Figure 1:
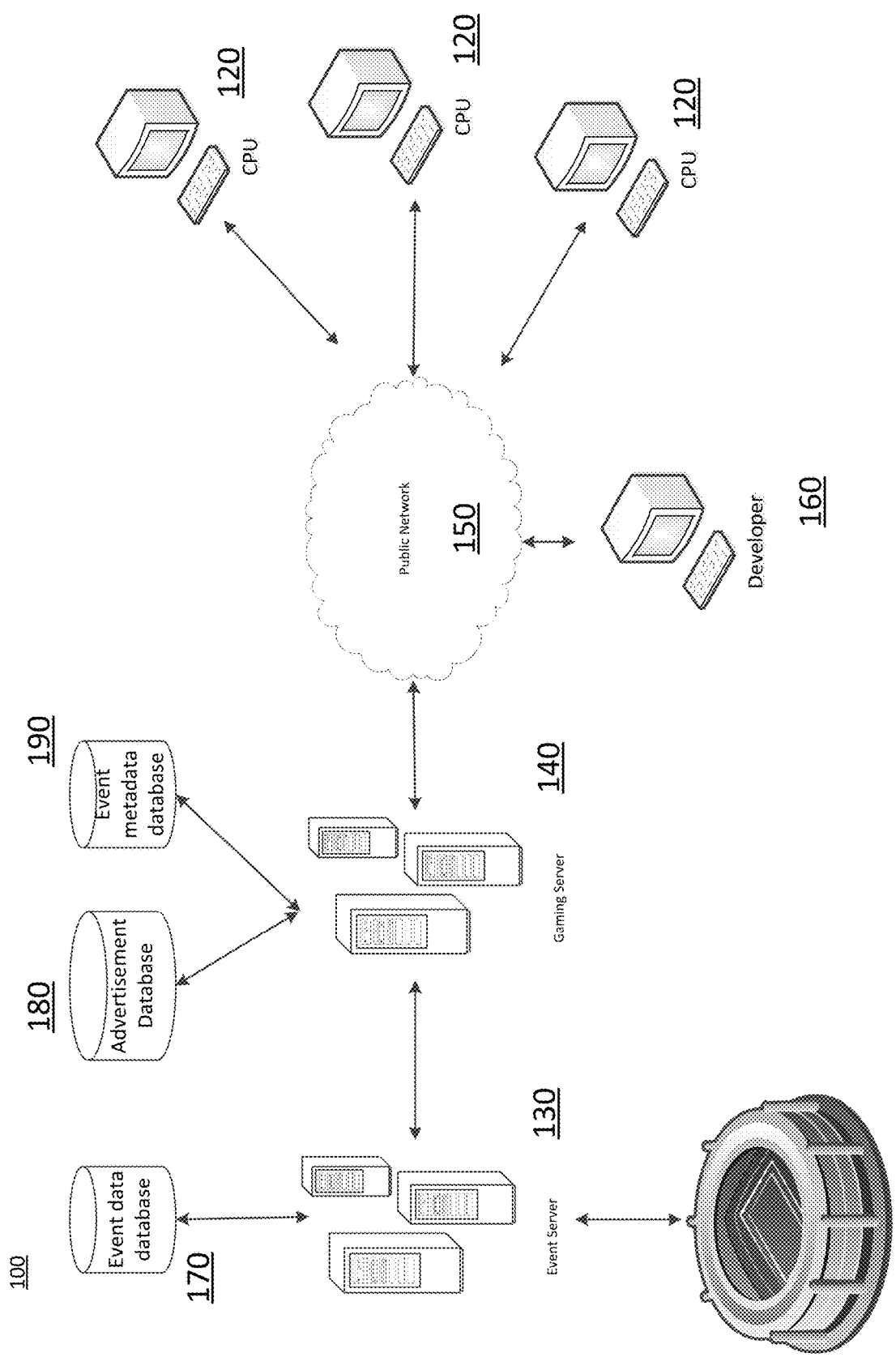
FIG. 1 is a system for scaled engagement and views in an e-sports event.

FIG. 1 is a system 100 for scaled engagement and views in an e-sports event. The scaled engagement and views can be implemented via VR and non-VR features. The system 100 would also facilitate monetization of the e-sports events with the various remote viewers on their respective user computing devices 120.

As an overview, the system 100 provides distribution of e-sport event data from a live e-sport event 110 to various remote users on their respective computing devices 120. The distribution may include, for example, live broadcast streams from which remote viewers may view on their respective computing devices 120. The e-sport event data from the live e-sport event 110 is collected and processed at event server 130. The e-sport event data from the live e-sport event 110 is then transmitted to the gaming server 140 that performs the modifications to the e-sport event data. Described in further detail below, the modifications to the e-sport event data at the gaming server 140 may include incorporation of statistics and illustrations highlighting key events within the e-sport event data. Furthermore, the game server 140 can also change viewer perspectives of the e-sport event data via selection of different point of views (e.g. different player perspective, different perspective within the video game), add commentators to the live-event data, add audio (e.g. cheers, taunts, interactions) related to the crowd attending the live e-sport event, and implement monetization features (e.g. advertisements from an ad database 180).

After any numbers of modifications have been performed by the gaming server 140, the e-sport event data can then be provided to the public network 150 where users on their computing devices 120 can receive and view the e-sport event data. Exemplary computing devices 120 may include laptops, desktops, mobile devices, and tablets. The viewing of the e-sports data can be performed in a VR or non-VR environment. The users may be able to directly download the e-sport event data to their computing devices 120 through the use of various software applications installed on the computing devices 120. In other situations, web-based applications or streaming services may provide user access to and viewing of the e-sports event data. Users may then be able to view the e-sports event data as a video stream inclusive of all the modifications such as statistics, commentators, crowd interactions, and advertisement added by the gaming server 140.

As noted above, the e-sports event data may be provided to the computing devices 120 to be implemented using virtual reality (VR) or augmented reality (AR) as another way to display the e-sport event data for further user immersion. For example, VR or AR implementation could provide a user perspective as if the user viewpoint is the same as those participating within the video competition or the same as a character within the video game of the video competition. VR or AR may also allow for the modification of the display of the e-sport event data such as providing different ways to modify user viewpoint of the video game or add additional data (e.g. statistics, highlights) to highlight aspects of the e-sport event data. VR or AR can also be used to simulate a viewing experience as if the viewer was attending the live e-sport event. For example, viewers could be assigned a view based on a ticket purchase, be provided audio (e.g. cheers, taunt) of other attendees, and be provided functions (e.g. chat) that would allow interaction with the other attendees. Further details regarding the features of the system 100 and how each of the features are used to carry out the scaled engagement and views for an e-sport event will be provided below.

The event server 130 obtains e-sport data from a live e-sport event 110. The live e-sport event 110 can be a video game competition held at a predetermined location such as an arena or stadium dedicated to e-sports. The live e-sport event data obtained from the live e-sport event 110 would include gameplay information associated with each of the video game competitors participating within the live e-sport event 110.

As an example, if the live e-sport event 110 is a first-person shooter game between ten different players (e.g. 5 versus 5 match), the live e-sport event data would be the gameplay data associated with each of those ten players during the match. The gameplay data being obtained from the live e-sport event 110 may include video gameplay information associated with each player's individual interactions with respect to the videogame such as each of their point of view and game state within the video game at any given moment in time. The gameplay data may also include different player's inputs (e.g. keyboard and mouse inputs) and communications (e.g. voice and text chat) between teammates that each competitor provides during the course of the match as well.

The event server 130, in the process of obtaining gameplay data for each player, can also obtain video recordings of each player during the course of the match. The video recordings may be recordings of each player's screen as the video game match is occurring. The video recording may also be an in-game perspective of the video game match using features (e.g. spectator camera perspectives) associated with the video game. This video data can be provided to the gaming server 140 to be used in the distribution of the live e-sport event (or used to supplement rendered gameplay video from the gaming server 140) sent to the users on their computing devices 120.

The event server 130 may also be capable of obtaining information related to video game being played during the e-sport event 110. For example, microphones, cameras, and/or sensors may be used to capture information about the audience attending the live e-sport event 110. Furthermore, any audio and video related to on-site commentators can also be captured by the event server 130.

The event server 130 can store the information obtained from the live e-sport event data in an event database 170. The event database 170 may be used to store the video data as well as any gameplay information retrieved from the event server 130. The information stored within the event database 170 can be accessed by the gaming server 140 as needed, for example, to generate statistics related to past performance of particular players for use in any e-sport event stream.

The gaming sever 140 generates the e-sport event data that will be distributed to users on their computing devices 120. The distribution of e-sport event data may generally include a video recording of the live e-sports event 110 along with additional information and commentary aimed at immersing the user when viewing the live e-sports event. The video recording may be obtained directly from the e-sports event 110 via the event server 130. It may also be possible for the gaming server 140 to re-render game states of the video game using only the extract gameplay data from the vent server 130. For this situation, the gaming server 140 may have stored related video game assets associated with the video game associated with the e-sports event 110. By using the extracted gameplay data and the stored video game assets, the gaming server 140 may be able to re-create video of the video game as if it was recorded directly via the gaming server 140.

The gaming server 140, using the live e-sport event data coming from the event server 130, can then extract relevant information the e-sport data streams that viewers will view on their computing devices 120. The types of extracted information obtained by the gaming server 140 can be the information that viewers may find interesting.

Although video games may be capable of providing some of the information that the gaming server 140 may be capable of extract and processing for viewer consumption, the gaming server 140 may also be capable of providing additional information that video games do not typically track/monitor. For example, the gaming server 140 may be able to extract each individual statistics associated with a particular match by analyzing the game-state and each player input during the course of the match. Information (as applied to a first person shooter such as kills, deaths, and accuracy) may generally be available information from the video game. However, the gaming server 140 would be able to provide further nuanced information from the gameplay data such as each player's reaction time for shots and the number of near misses.

The nuanced information would be obtainable by the gaming server 140 through the use of customizable instructions that allow the gaming server 140 to aggregate relevant gameplay information and process the information to obtain the desired statistic. For the exemplary reaction time for shots, the gaming server 140 may be programmed to aggregate the gameplay data and track situations when a target is spotted by a player within an aiming reticle and timing when a shot is fired once the target is spotted. With respect to near misses, game-state information can be aggregated and processed to identify for all shots that miss the target, where the shot was in relation to the target.

With the information that the gaming server 140 is able to obtain from the e-sport event data, metadata is generated so that such information can be associated with distributed live e-sport event data (e.g. video recording of the live e-sport event) to the users on their computing device 120. The video recording of the e-sport event (described below) would use the metadata to associate what information should be associated with a particular time frame of the video. For example, at a particular part of a stream, information about a player's current performance can be added as a bubble nearby that player's avatar within the game. The metadata would be used as an indicator regarding what information would go there.

Furthermore, the gaming server 140 could aggregate information from each of the player's gameplay data in order to compile a map that is a composite summary of the video game at any point in time. For example, first person shooters may not typically generate a comprehensive map that includes all the positions of each player on both teams. Generally, in-game maps would include information from one team's perspective. The other team may be obscured (for example by "a fog of war" type effect). However, the gaming server 140 would be able to provide a full unobstructed view of the map using game-state information from both teams so that viewers may have a complete understanding of what is happening within the video game at any moment. This feature would not prevent the ability of the system 100 to restrict user vision of the event as needed (e.g. to provide a particular player's or team's perspective).

The gaming server 140 can also provide different viewpoints of the event. The event server 130 collects all types of information from the live e-sport event that includes the viewpoints from different players. Furthermore, videogames may have the ability to provide different viewpoints of the environment within the game and the gaming server 140 using this feature can similarly change the viewpoint that users can view on their computing devices 120.

In a further embodiment, the gaming server 140 is capable of using the collected information from the live e-sport event from the different players in order to reconstruct a different viewpoint if such viewpoint is not available within the video game. This may be done by using the collected information from the event server 130 and the stored game assets available to the gaming server 140. The gaming server 140 may be able to re-render what the state of the video game at a given point in time and then focus re-rendering certain portions based on the desired focus. This allows the gaming server 140 to provide a different (and possibly comprehensive) view of the video game using all the information available in situations where only partial information may be known by each individual participant (e.g. eliminating "fog of war" effects).

The gaming server 140 is also capable of incorporating advertisements within the distribution of the live e-sport event data to facilitate monetization. Advertisements may be stored in a dedicated advertisement database 180. When needed, the gaming server 140 can query the advertisement database 180 for the appropriate advertisement(s) to be implemented into the distribution of the live e-sport event data. What advertisement is chosen can be based on a number of different factors. For example, user profiles may be used to select types of ads a particular user may be interested in viewing. Certain developers or tournament organizers may also indicate a set of advertisements that should be incorporated into the distribution of the live e-sport event data. The advertisements themselves may include information that suggests the types of users and/or streams that they may be incorporated with. For example, certain advertisements may be incorporated if a particular genre or a particular video game is distributed. The incorporation of the advertisements allows for the monetization of the live e-sport events to many possible remote viewers on their computing devices 120.

Commentary can also be added to the distribution of the live e-sport event data using information obtained from the event server 130 (for example from commentators at the live e-sport event 110). In other situation, one or more users on their computing devices 120 may be capable of assuming a commentating role. The users that assume a commentating role may need to be verified and authenticated beforehand (so as to control who is able to commentate and provide their commentary to remote viewers alongside the live e-sport event data), but would allow a variety of different commentators to commentate the same live e-sport event 110.

If authenticated and verified, these users may be provided a unique user interface that interacts with the gaming server 140 in order to modify the distribution of the live e-sport event data to correspond to their commentary. For example, the commentators may be able to control viewpoints of the game data of the e-sport event being distributed as well as the additional information that is displayed as well. Such features would facilitate the effectiveness of the commentary allowing the commentators to focus on events within the distribution of the live e-sport event data and provide corresponding details related to what is being discussed. Since each user may have a preferred commentator, the ability to allow third parties and users to introduce their own commentary into the system 100 would also be beneficial for views of the e-sport event.

The public network 150 facilitates communication of the e-sports event data from the gaming server 140 with the plurality of user computing devices 120. The public network 150 can also include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers include the public switched telephone network, a cable service provider, a provider of digital subscriber line (DSL) services, or a satellite service provider.

Developers 160 are also able to affect how the distribution of the live e-sport event data is performed. Developers 160 are able to interact with the event server 130 and gaming server 140 using their respective computing devices. For example, developers 160 may create, run, and manage the live e-sport event. Furthermore, modifications to how the distribution of the live e-sport event data are sent to the remote viewers on their computing devices 120 can also be implemented by the developers 160 such as identifying what advertisements should be incorporated and what additional information (e.g. statistics) should be shown during the distribution of the live e-sport event data.

The event data database 170 may be associated with the event server 130 and used to store the live e-sport event data obtained from the live e-sports event 110. The event server 130 may be capable of obtaining a variety of different types of e-sport event data from the live e-sport event 110 inclusive of video recordings, audio, and text-based information.

The e-sport event data obtained from the live e-sport event 110 can be subsequently stored in the event data database 170. In some situations, the information stored in the event data database 170 can be accessed at a future time and date for example, to analyze and obtain statistics about the live e-sports event after the live event has been completed. Although the event server 130 can directly transmit the e-sport event data obtained from the live e-sport event 110, it may also be possible that the gaming server 140 access the event data database 170 for some or all the information that will be distributed to the users.

The advertisement database 180 is used to store a plurality of different advertisements that can incorporated into the streams of the e-sport event data being provided to the users by the gaming server 140. The gaming server 140 may include an advertisement profile that includes information regarding the types of advertisements that can be incorporated into the streams, for example, based on the e-sport event being streamed, and the user viewing the stream. Advertising companies, streaming services and/or developers may be able to specify the types of advertisements that are incorporated into the e-sport event streams. For example, advertising companies may have user information that can be used to match particular advertisements to particular users on their computing devices 120. Streaming services may have agreements with particular advertising companies to show certain advertisements during the course of streaming an event.

The event metadata database 190 is used to store the metadata associated with the e-sport event streams being provided to the user computing devices 120. The gaming server 140 can generate the metadata to indicate what additional information (e.g. statistics, advertisements) can be incorporated with an event data stream and where in the stream the additional information is incorporated. The metadata is associated with the streams so that additional information (such as each statistics of each participating player within the e-sport event) can be incorporated at appropriate times. For example, metadata may be used to link a player kill/death ratio whenever that player kills another player or is killed by another player. Metadata can similarly be used to link relevant game state information to be displayed on the e-sport event data stream such as the player's current equipment, health, level, and rank whenever that player appears on the stream.

Each metadata generated by the gaming server 140 may be assigned a unique identification that is linked with e-sport event data used in a stream. Because the metadata is uniquely identified to be associated with event data and is used to indicate where and when the additional information is incorporated into the event data stream, it is not necessary for the gaming server 140 to store the entire event data used in the stream and the additional information obtained from the live e-sports event 110. Instead, whenever e-sport event data is used in a stream, the corresponding metadata associated with the e-sport event data can be retrieved from the event metadata database 190 via the gaming server 140 querying the event metadata database 190 for any relevant metadata.

Figure 2:
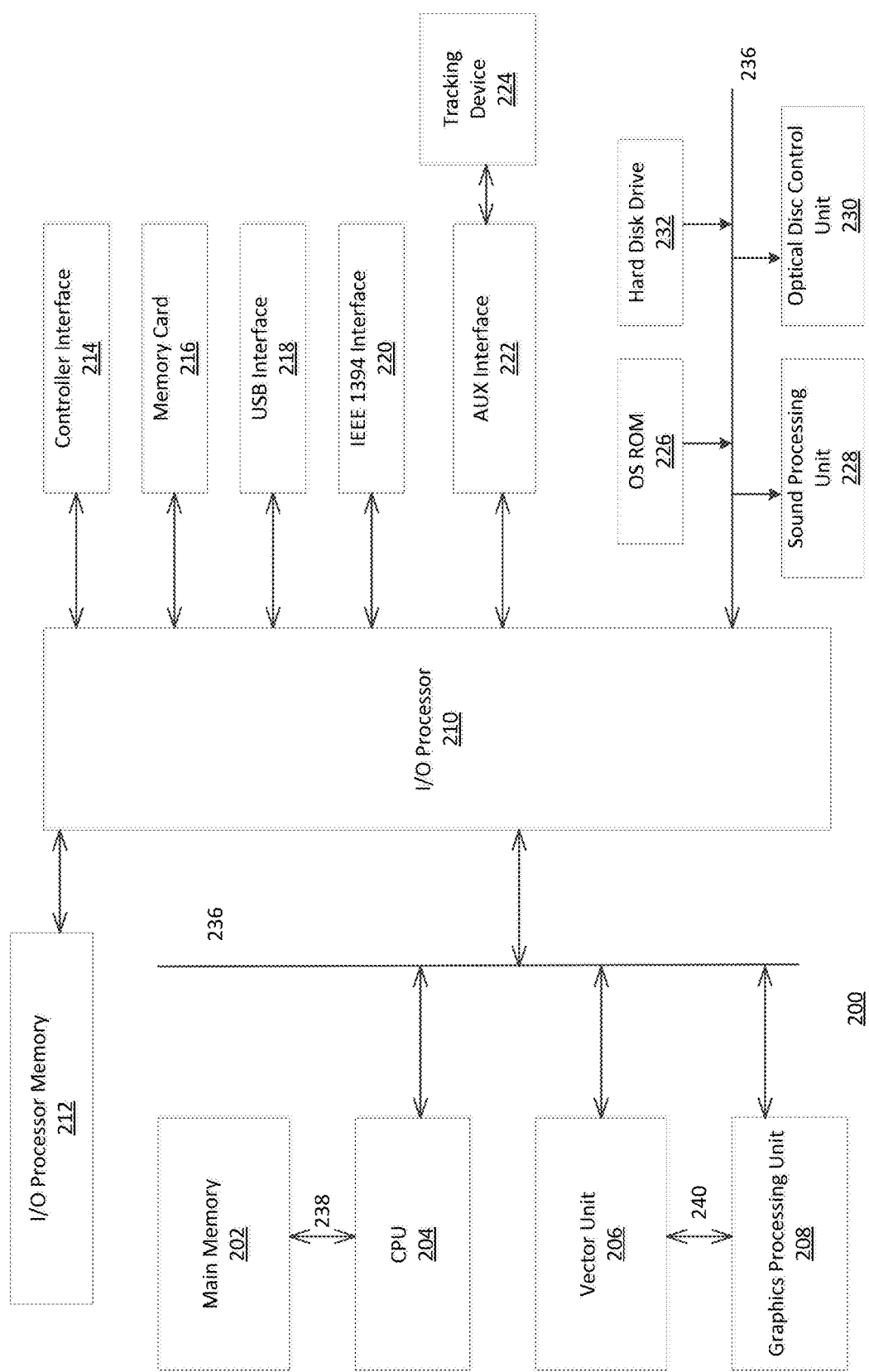
FIG. 2 is a user device used in context of the system of FIG. 1.

FIG. 2 is a user computing device 200 used in context of the system of FIG. 1. The user computing device 200 (e.g., desktop, laptop, tablet, mobile device, console gaming system) is a device that the user can utilize to facilitate carrying out features of the present invention pertaining to the scaled engagement and views for the e-sport event. In particular, the user computing device 200 allows the user to view the distribution of live e-sport event data remotely. The user computing device 200 would facilitate the user viewing of the live e-sport event data via a display associated with the user computing device 200.

The user computing device 200 may include various elements as illustrated in FIG. 2. It should be noted that the elements are exemplary and that other embodiments may incorporate more or less than the elements illustrated. With reference to FIG. 2, the user computing device 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, an auxiliary (AUX) interface 222 for connecting a tracking device 224, although other bus standards and interfaces may be utilized. The user computing device 200 further includes an operating system read-only memory (OS ROM) 226, a sound processing unit 228, an optical disc control unit 230, and a hard disc drive 232, which are connected via a bus 234 to the I/O processor 210. The user computing device 200 further includes at least one tracking device 224.

The tracking device 224 may be a camera, which includes eye-tracking capabilities. The camera may be integrated into or attached as a peripheral device to user computing device 200. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 224 may include a microphone integrated into or attached as a peripheral device to user computing device 200 that captures voice data. The microphone may conduct acoustic source localization and/or ambient noise suppression. The microphones may be usable to receive verbal instructions from the user to schedule, retrieve and display content on the user computing device 200.

Alternatively, tracking device 224 may be the controller of the user device 200. The controller may use a combination of built-in accelerometers and infrared detection to sense its position in 3D space when pointed at the LEDs in a sensor nearby, attached to, or integrated into the console of the entertainment system. This design allows users to control functionalities of the user computing device 200 with physical gestures as well as button-presses. The controller connects to the user computing device 200 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user computing device 200 may be an electronic gaming console. Alternatively, the user computing device 200 may be implemented as a general-purpose computer, a set-top box, or a hand-held gaming device. Further, similar user devices may contain more or less operating components.

The CPU 204, the vector unit 206, the graphics processing unit 208, and the I/O processor 210 communicate via a system bus 236. Further, the CPU 204 communicates with the main memory 202 via a dedicated bus 238, while the vector unit 206 and the graphics processing unit 208 may communicate through a dedicated bus 240. The CPU 204 executes programs stored in the OS ROM 226 and the main memory 202. The main memory 202 may contain pre-stored programs and programs transferred through the I/O Processor 210 from a CD-ROM, DVD-ROM, or other optical disc (not shown) using the optical disc control unit 232. The I/O processor 210 primarily controls data exchanges between the various devices of the user device 200 including the CPU 204, the vector unit 206, the graphics processing unit 208, and the controller interface 214.

The graphics processing unit 208 executes graphics instructions received from the CPU 204 and the vector unit 206 to produce images for display on a display device (not shown). For example, the vector unit 206 may transform objects from three-dimensional coordinates to two-dimensional coordinates, and send the two-dimensional coordinates to the graphics processing unit 208. Furthermore, the sound processing unit 230 executes instructions to produce sound signals that are outputted to an audio device such as speakers (not shown).

For VR and AR embodiments, the graphics processing unit 208 would still provide the live e-sports data to the display device (not shown) associated with the user computing device 200. The display device (not shown) would be a head-mounted display that would be capable of receiving the rendered virtual environment provided by the graphics processing unit 208 using the live e-sports data. For example, the live e-sports data could have the graphics processing unit 208 render the view of the live e-sport event as if the viewer was sitting in a particular seat of an arena/stadium where the live e-sport event is happening. Alternatively, the live e-sports data could have the graphics processing unit 208 render the view as corresponding to within the video game associated with the live e-sports event.

A user of the user computing device 200 provides instructions via the controller interface 214 to the CPU 204. For example, the user may instruct the CPU 204 to store certain information on the memory card 216 or instruct the user device 200 to perform some specified action. Example controllers associated with the controller interface 214 usable in both VR and non-VR embodiments may include a touch-screen, keyboards and game controllers.

Other devices may be connected to the user computing device 200 via the USB interface 218, the IEEE 1394 interface 220, and the AUX interface 222. Specifically, a tracking device 224, including a camera or a sensor may be connected to the user computing device 200 via the AUX interface 222, while a controller may be connected via the USB interface 218. In some embodiments, a VR headset or related hardware equipment may be communicatively coupled to computing device 200 via one or more computing interfaces. Hardware and related software for implementing an augmented reality (AR) experience may similarly be coupled to computing device 200 via one or more computing interfaces.

Figure 3:
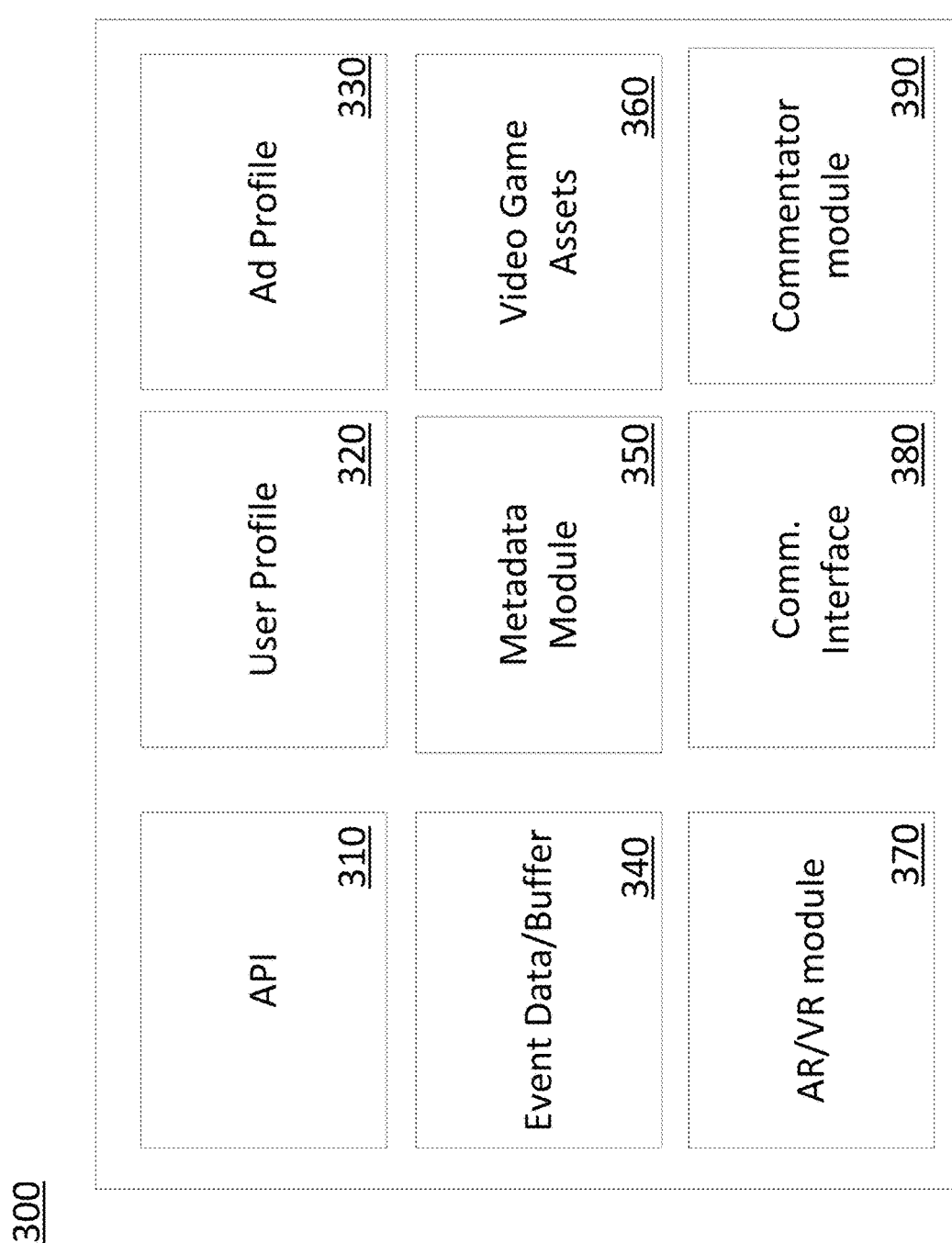
FIG. 3 is the gaming network of FIG. 1.

FIG. 3 is the gaming server 300 of FIG. 1. The gaming server 300 includes a plurality of different features that facilitates the scaled engagement and views in an e-sports event. As illustrated in the figure, the gaming server 300 may include an application program interface (API) 310, storage for user profiles 320, storage for advertisement profiles 330, e-sport event data storage and buffer 340, metadata module 350, storage for video game assets 360, AR/VR module 370, and communication interfaces 380. Details regarding each of these features will be provided below in further detail.

The application program interface (API) 310 allows an entity to manage how live e-sport event data is distributed to remote viewers. Using the API 310, an administrator (e.g. developer, tournament organizer) can customize and modify how the gaming server operates with respect to what data is retrieved from the event server, what data is processed and generated from the event server, and how the e-sport event data is distributed to the remote viewers. For example, the administrator (through the use of the API 310 can create and/or modify the information associated with the various user profiles 320 and advertisement profiles 330 that indicate the types of additional content that will be implemented into the distribution of the live e-sport event data to the remote viewers.

Furthermore, any updates needed with respect to the features associated with the gaming server can be implemented using the API 310 as well. For example, various video games may obtain patches and or other fixes during the course of a live e-sport event or between live e-sport events. The API 310 can be used to modify the video game assets 360 to incorporate those patches and other fixes as well.

The user profile 320 is used to store information about each remote viewer. Remote viewers may need to create their own profile and sign in to their respective profiles before being allowed to access/view live e-sport event data. The user profiles 320 would be used by the gaming server 300 to identify the types of modifications to the live e-sport event stream that can be carried out to better immerse the user in the viewing experience.

In embodiments where people would need to purchase a ticket to attend the live e-sport event in person, remote viewers may also be required to purchase from one of many possible different tickets or purchase subscriptions in order to remotely view the live e-sport event. If there are different tickets or different status based on subscription types, the user profile 320 can store the information related to the remote user. There may be, for example, different features or viewpoints available for a user based on their status associated with a particular ticket and/or subscription purchase. If ticket A allows a "nose bleed" vantage point of the live e-sport event while ticket B allows "court side" vantage point of the live e-sport event, the particular ticket purchased will be stored in the user profile 320.

The user profile 320 may also store user preferences about the distribution of the live e-sport event data being remotely viewed on their user computing device. For example, the user profile 320 can customize preferred viewpoints, preferred additional information to be displayed, preferred commentators, and what advertisements they may be interested in. The user profile 320 can be updated anytime by the respective user through their user computing device.

The user profile 320 can also store information about the user computing devices. This information can be used by the gaming server 300 to identify how the live e-sport event data can be processed and transmitted. This may identify, for example, the format the live e-sport event data would need to be transmitted in order to be compatible with the user computing device. With all the information about the user stored in the user profile 320, the gaming server 300 would be able to identify the appropriate version of the live e-sport event data to be distributed.

The advertisement profile 330 is used to store information that instructs what advertisements can be shown to users and when they should be shown. Different advertisements may be incorporated into the distribution of the live e-sport event data based on, for example, user preference, video game genre, and video game title. Some profiles 330 may include user preferences so that each user is provided a relevant advertisement.

Upon the gaming server identifying metadata corresponding to the distribution of the live e-sport event data associated with an advertisement that should be incorporated, the gaming server can query the advertisement profile 330 to identify one or more advertisements that should be incorporated. The advertisement profile 330 may include information identifying where certain advertisements are stored in situations where advertisements are stored in separate database. Once retrieved, the advertisement can be implemented into the distribution of the live e-sport event data and sent to each remote viewer on their computing device. It is possible that each user can have different advertisements based on their preference. It is also possible that a single advertisement can be provided to all remote viewers based on the distribution of the live e-sport event data.

The e-sport event data storage and buffer 340 is used to store e-sport event data coming from the event server. The e-sport event data storage and buffer 340 may be used to temporarily store the e-sport data until it can be processed and used in the distribution of the live e-sport event data.

The metadata module 350 generates metadata for the e-sport event data being distributed to the remote viewers on their computing devices. The generated metadata identifies the types of information to be incorporated into the distribution of the live e-sport event data as well when that information should be presented. For example, metadata may be generated based on whenever a particular player's avatar appears in the distribution of the live e-sport event data and instructs that additional information regarding that player's avatar's health, progress, and other game-related statistics be displayed in a bubble nearby the player's avatar. The metadata can also be used to identify the advertisements that should be incorporated into the distribution of the live e-sport event data.

The metadata generated by the metadata module 350 is uniquely associated with the distribution of the live e-sport event data. This can be performed, for example, by providing unique labels that connect one with the other. In this way, the e-sport event data used in distribution to the remove viewers can be stored separately from the metadata that is generated. However if the e-sport event data is ever retrieved and viewed by the user, the corresponding metadata can be queried and applied accordingly.

Storage for video game assets 360 includes assets associated with the live e-sport event. The stored assets are used by the gaming server to reconstruct gameplay of the video game using the e-sport event data from the event server. In addition to possibly using video-based information from players or in-game information from the event server, the gaming server would also be able to recreate gameplay using the e-sport event data. This may include generating a comprehensive map of all participants.

The use of the video game assets 360 can also be used to generate different viewpoints that would not be available within the video game itself. This can be tied with the AR/VR module 370 where the gameplay assets would be useful in generating a three-dimensional simulation of the in-game environment in an AR or VR setting allowing a first person perspective for the user on their computing device. The AR or VR perspective may also place the user's viewpoint as the player's avatar.

The AR/VR module 370 may also introduce audio and other interactions related to other users or attendees at the live e-sport event. For example, the AR/VR module 370 may include the cheers and taunts of the attendees so that the viewer would be able to experience what the atmosphere would be like. Features (e.g. chat) could also be introduced by the AR/VR module that allows the viewer to interact with various attendees at the live e-sport event.

The communication interface 380 facilitates communication between the various features of the system of FIG. 1. For example, this would facilitate transmission of information from the event server to the gaming server as well as from the gaming server to the remote viewers. The communication interface 380 also facilitates user interactions (e.g. developer, commentators) with the gaming server.

The commentator module 390 facilitates the implementation of commentators into the distribution of the live e-sport event data. The commentator module 390 can provide unique user interface and tools that would allow commentators to control how the displays associated with the distribution of the live e-sport event data are generated and presented, for example, what additional information should be shown and what viewpoint to use.

FIG. 4 is a method 400 for providing the scaled engagement and views to a remote viewer. The remote viewer would be provided, for example via a broadcast stream, distribution of live e-sport event data that has been customized for a more immersive viewer experience. The scaled engagement and views can be implemented via VR and non-VR embodiments. The customization can also incorporate advertisements for the purpose of providing possible monetization as well.

In step 410, e-sport data is obtained from the live e-sport event. The types of information collected during the course of the live e-sport event can be customized to focus on the types of information used to calculate particular statistics and/or particular participants. If there is a desire to provide a more immersive experience using other audience members during the live e-sport event (for example for a VR or AR embodiment that includes audience interaction), information associated with the live audience may be collected as well. Exemplary audience information may include audio of various attendees' cheers, commentary, and taunts that have been captured via microphones associated with the live e-sport event.

Each venue that hosts a live e-sport event may have various features that facilitate in the collection of information related to the live e-sport event. Cameras, microphones, and various other types of sensors can be used to obtain information about what may currently be happening with respect to the video game (e.g. each video game competitor game state, progress, statistics) as well as information about the audience attending the live e-sport event (e.g. reactions such as cheers/taunts, preferences regarding participants in the live e-sport events, and interactions such as participation in surveys).

In some embodiments, the venue, tournament organizer, or developer that is running and managing the live e-sport event may also provide specific computing devices (e.g. consoles, desktops) for each participant within the live e-sport event to use for the competition. These provided computing devices may have built in functions that directly collect any and every type of information about each participant during the live e-sport event.

After being collected, the live e-sport event data will be sent to the gaming server so that it can be processed before being distributed to remote viewers who also would like to view the live e-sport event. In some embodiments, the e-sport event data can also be stored in a database for reference at a later time. For example, stored e-sport data may be accessed by the gaming server or other third party in order to obtain and process historical information (e.g. past performance) about a particular player.

In step 420, the e-sport data obtained from the live e-sport event is processed. The processing is performed at the gaming server. The live e-sport event may be created, run, and managed by a tournament organizer, which in some cases may also be the developer of the video game associated with the live e-sport event. The tournament organizer would have gaming servers for use in processing the information coming from the live e-sport event which would subsequently be sent to the remote viewers on their respective user computing devices.

As an example, certain video games may already track certain statistics of players associated with a video game. First person shooters may already track kills, deaths, and accuracy. In situations where the games do not track these information or there are other detailed information that viewers may be interested in viewing (e.g. response time), it would be possible to have the gaming server process the information coming from the live e-sport event in order to obtain this information.

Furthermore, the gaming server may have profiles for specific users (or groups of users) identifying the types of detailed information that the remote viewers may be interested in viewing. Viewers who have played the game and are invested in the competitive scene for a particular live e-sport event may be more prone view the detailed information compared to casual viewers who have not played the game. Furthermore, it may be possible that users can indicate what information they may want to view (and/or not want to view) specifically. In this way the gaming server can be informed regarding what information should be associated with particular distribution of live e-sport event data.

In step 430, the gaming server would generate an e-sport event display based on the processed live e-sport event data. The initial generated e-sport event display may include the video recording obtained of live e-sport gameplay. The display may also incorporate information obtained from the live e-sport event such as audio from a live commentator and/or music being played. For AR/VR embodiments, the generated display could be a virtual simulation (that includes visuals and sounds) associated with a viewpoint within the live e-sport venue or within the videogame itself.

In some situations, the e-sport event display may also involve generating a comprehensive view of what is occurring within the game using information from multiple players simultaneously. In games that utilize "fog-of-war" mechanics that obscure portions of the environment based on the player and/or team vision of the environment, the gaming server could provide different views of what the gaming environment would be (e.g. complete, team-specific) for the remote viewers using the gameplay information from multiple users.

In step 440, the e-sport event display is modified to provide more immersive viewer experience. Metadata is associated with the e-sport event display that is used to identify when and what type of additional information should be associated with the e-sport event display. For example, metadata may be generated whenever a particular player is viewed within the display. This metadata may indicate that certain statistics (e.g. level, role, health) for the player should always be shown when the player is present in the display. The metadata would allow users to comprehend the state of the game and track the interesting elements of the live e-sport event.

The types of additional information to be included in the display can be customized based on a user basis (e.g. user preference), or group basis (e.g. experience with the game, gender, viewer location). For example, users may be able to instruct that only certain players or teams should have the additional information. In some cases, the users could also identify the types of additional information to be included.

Further modification may include changing a point of view. Point of view can be selected to provide the best view of the most interesting event(s) occurring within the live e-sport event. For example, preferences can be established (for example by the user who would like to follow a particular player) beforehand that allows specific point of view to be used whenever a particular player of interest (or group of players) is participating within the e-sport event. The gaming server can monitor the status of the live e-sport event and switch perspective within the game whenever that player appears or is engaged with players of the opposing team. Perspective changes may include changing the camera angle within the game, providing that player's point of view using that player's game data, or providing another player's point of view that includes that player of interest.

For virtual and augmented reality embodiments, it may be possible that the gaming server allows an administrator (e.g. commentator) to adjust the point of view to follow particular events that are being commented on occurring within the live e-sport event. The administrator interface (via their computing device) may allow control of the in-game camera or switching between different player perspectives within the video game of the live e-sport event through a user interface. The user interface may have elements associated with each player and selection of one or more elements may instruct the gaming server to generate a e-sport event display that corresponds to that point of view.

Other embodiments that allow an administrator using a virtual or augmented reality to view and commentate the live e-sport event can also facilitate control of the camera through the use of motion control (e.g. gestures). For example, a certain hand gesture could allow the administrator to zoom in/zoom out the camera, while a different gesture could allow the administrator to move the camera to a different position.

The VR and AR embodiments could also introduce audio for additional immersion. For example, audio from the audience can be provided to the user if the VR/AR simulation places the viewer within the live e-sport venue. In another embodiment, audio from within the video game such as environmental sounds or in-game music could be used if the VR/AR simulation places the viewer within the video game associated with the live e-sport.

The gaming server can also provide different viewpoints for the live e-sport event based on different characterizations. For example, a remote viewer may request the same viewpoint as a particular player on a team. Another viewpoint may be the viewpoint of a coach who may be responsible of overseeing multiple players simultaneously. Alternative viewpoints could be the view from within the venue of the live e-sport event. For example, a user could be provided a spectator's viewpoint of the live e-sport event as if the remote viewer is actually attending the live event. Each of these different viewpoints could be provided to the remote viewer based on, for example, a fee (e.g. ticket purchase) or paid subscription. This would allow remote viewers to further customize their viewing display for a more immersive experience Furthermore, advertisements can also be incorporated into the e-sport event display to facilitate monetization of the distribution of live e-sport event data. Different advertisements may be provided based on the distribution, the game involved, and/or the user viewing the distribution. For example, advertising companies may already have information about a number of different remote viewers and may have user profiles associated with these viewers. At predetermined periods of time within the distribution of the live e-sport event data, the gaming server may be instructed to retrieve related advertisements to show to remote viewers based on their user information.

It is also possible that the gaming server retrieve related advertisements based on the current live e-sport event. Advertisements may be selected, for example, based on the genre or the particular game being distributed. The e-sport event organizer and/or developer may also influence what types of advertisements are incorporated into the distribution of the e-sport event.

In step 450, the live e-sport event data is distributed to the remote users on their respective user computing devices. Generally these computing devices may include one or more displays that are used to display the e-sport event data (e.g. video) for the remote viewers to view. In some embodiments, the user computing device may be a computing device with an accompanying wearable headset that allows for display of virtual reality or augmented reality environments. At the very least, the e-sport event data streams should be viewable using any number of different existing video players associated with the user computing device and/or public network as well.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A method for providing scaled engagement and views of a live electronic sport (e-sport) event, the method comprising:
   collecting information from a live e-sport event that includes one or more in-game elements;
   generating statistics about players within the live e-sport event based on the collected information;
   generating a display that presents the live e-sport event from a perspective of an in-game camera using the collected information from the live e-sport event, wherein the generated display is associated with the generated statistics;
   modifying the generated display for a remote viewer using the generated statistics, wherein modifying the generated display includes implementing the live e-sport event to be displayed within an augmented reality environment and adjusting the perspective of the in-game camera to follow at least one of the in-game elements in accordance with a preference of the remote viewer; and
   distributing the modified display to a user device of the remote viewer.

2. The method of claim 1, wherein the collected information from the live e-sport event includes game related information from event-specific computing devices used by the players within the live e-sport event.

3. The method of claim 1, wherein the collected information from the live e-sport event includes information regarding an audience and audience reactions to the live e-sport event.

4. The method of claim 1, wherein modifying the generated display further includes incorporating advertisements.

5. The method of claim 1, wherein modifying the generated display is further based on a user profile associated with the remote viewer, wherein the user profile identifies the preference as being related to one or more of the detailed statistics of interest to the remote viewer.

6. The method of claim 5, wherein the user profile further identifies one or more additional preferences related to one or more types of advertisements of interest to the remote viewer.

7. The method of claim 1, wherein modifying the generated display further includes providing a plurality of different perspectives of the live e-sport event, the different perspectives based on different camera angles of the live e-sport event associated with the collected information.

8. The method of claim 1, wherein the remote viewer is provided one or more functions selectable to interact with one or more other viewers.

9. The method of claim 1, wherein the remote viewer is provided audio from one or more other viewers.

10. A system for providing scaled engagement and views of a live electronic sport (e-sport) event, the system comprising:
    an event server that collects information from a live e-sport event that includes one or more in-game elements, wherein the information includes player inputs and video gameplay information; and
    a gaming server that:
       generates statistics about players within the live e-sport event based on the collected information;
       generates a display that presents the live e-sport event from a perspective of an in-game camera using the collected information from the live e-sport event, wherein the generated display is associated with the generated statistics;
       modifies the generated display for a remote viewer using the generated statistics, wherein modifying the generated display includes implementing the live e-sport event to be displayed within an augmented reality environment and adjusting the perspective of the in-game camera to follow at least one of the in-game elements in accordance with a preference of the remote viewer; and
       distributes the modified display to a user device of the remote viewer.

11. The system of claim 10, wherein the collected information from the live e-sport event includes game related information from event-specific computing devices used by the players within the live e-sport event.

12. The system of claim 10, wherein the collected information from the live e-sport event includes information regarding an audience and audience reactions to the live e-sport event.

13. The system of claim 10, wherein modifying the generated e display further includes incorporating advertisements.

14. The system of claim 10, wherein modifying the generated display is further based on a user profile associated with the remote viewer, wherein the user profile identifies the preference as being related to one or more of the detailed statistics of interest to the remote viewer.

15. The system of claim 14, wherein the user profile further identifies one or more additional preferences related to one or more types of advertisements of interest to the remote viewer.

16. The system of claim 10, wherein modifying the generated display further includes providing a plurality of different perspectives of the live e-sport event, the different perspectives based on different camera angles of the live e-sport event associated with the collected information.

17. The system of claim 10, wherein the remote viewer is provided one or more functions selectable to interact with one or more other viewers.

18. The system of claim 10, wherein the remote viewer is provided audio from one or more other viewers.

19. A non-transitory computer-readable storage medium having embodied thereon a program, the program being executable by a processor to perform a method for providing scaled engagement and views of a live electronic sport (e-sport) event, the method comprising:
    collecting information from a live e-sport event that includes one or more in-game elements;
    generating statistics about players within the live e-sport event based on the collected information;
    generating a display that presents the live e-sport event from a perspective of an in-game camera using the collected information from the live e-sport event, wherein the generated display is associated with the generated statistics;
    modifying the generated display for a remote viewer using the generated statistics, wherein modifying the generated display includes implementing the live e-sport event to be displayed within an augmented reality environment and adjusting the perspective of the in-game camera to follow at least one of the in-game elements in accordance with a preference of the remote viewer; and distributing the modified display to a user device of the remote viewer.

* * * * *